March 23, 1954      G. W. PENNEY      2,672,948

IONIZING UNIT FOR ELECTROSTATIC FILTERS

Filed Dec. 9, 1952      3 Sheets-Sheet 1

INVENTOR.
Gaylord W. Penney
BY
HIS ATTORNEYS

March 23, 1954　　　G. W. PENNEY　　　2,672,948
IONIZING UNIT FOR ELECTROSTATIC FILTERS
Filed Dec. 9, 1952　　　　　　　　　　　　3 Sheets-Sheet 2

INVENTOR.
Gaylord W. Penney
BY
HIS ATTORNEYS

March 23, 1954  G. W. PENNEY  2,672,948
IONIZING UNIT FOR ELECTROSTATIC FILTERS
Filed Dec. 9, 1952  3 Sheets-Sheet 3

INVENTOR.
Gaylord W. Penney
BY
HIS ATTORNEYS

Patented Mar. 23, 1954

2,672,948

UNITED STATES PATENT OFFICE 2,672,948

IONIZING UNIT FOR ELECTROSTATIC FILTERS

Gaylord W. Penney, Pittsburgh, Pa., assignor to Trion, Inc., McKees Rocks, Pa., a corporation of Pennsylvania Application December 9, 1952, Serial No. 324,883

13 Claims. (Cl. 183—7)

This application relates to an ionizing unit for electrostatic filters. As is well known, electrostatic filters are used to remove solid or liquid particles from fluid, such as air or gas, by ionizing the solid or liquid particles and then collecting them on charged plates. One well-known type of electrostatic filter accomplishes this in two stages. The fluid, such as air or gas, to be cleaned passes through an ionizing section in which the solid or liquid particles are charged. The fluid then passes through a collecting section which has oppositely charged plates to which the charged particles in the fluid are attracted. I have invented an improved ionizing unit for use in the ionizing section of such an electrostatic filter which is particularly useful for so-called "high velocity" electrostatic filters.

High velocity filters are electrostatic filters in which the fluid to be cleaned is forced through the filter at velocities which are multiples of the velocities at which the fluid to be cleaned is forced through conventional electrostatic filters now used, for example, to clean the air in homes, offices and factories. In such conventional filters, the air is forced through them at the rate of three to four hundred feet per minute, whereas in "high velocity" filters, the air can be forced through the filters at speeds ranging up to approximately 2000 feet per minute. By increasing the speed of fluid flow, a much larger volume of air per unit of time can be treated than in conventional filters without increasing the overall size of the filter.

Ionizing units now used in conventional electrostatic filters generally comprise a series of fine wires known as ionizing wires which are spaced parallel to each other and which extend across the path of the incoming fluid to be cleaned. Spaced between these ionizing wires are electrodes having a considerably greater surface area than the ionizing wires. A high unidirectional electrostatic field is maintained between the ionizing wires and the collecting electrodes. The air or gas to be cleaned flows between the ionizing wires and the electrodes, and the solid or liquid particles in the air or gas are ionized. The ionized particles are then attracted to collecting plates in the collecting section of the filter.

A definite amount of time is required to ionize the solid or liquid particles and, therefore, the fluid or air must remain within the ionizing zone created by the electrodes for this definite amount of time, although this time is, of course, extremely small. If the velocity at which the fluid passes through the filters is increased, obviously the time during which the particles carried by the fluid are subjected to the ionizing field is decreased and it is the purpose of my invention to overcome this problem.

The fluid could be passed through a series of conventional ionizing sections arranged one after another. However, such a structure would considerably increase the overall size of the filter and thus defeat one of the principal purposes of a high velocity filter, which is to increase the volume of air which can be passed through the filter without proportionately increasing the size of the filter.

I have invented an ionizing section having a plurality of sets of electrodes so arranged that the fluid to be cleaned is within the ionizing zone created by the electrodes a sufficient time to ionize the particles without, at the same time, materially increasing the length of the ionizing section. My ionizing unit also eliminates the "dead" zones which exist adjacent to supports for the ionizing wires. Heretofore baffles have been used to prevent the fluid to be cleaned from passing through such zones in order not to pass uncleaned fluid through the filter. My ionizing unit uses baffles, but requires considerably fewer baffles than have heretofore been used, thus increasing the amount of air that can pass through the filter without increasing the overall size of the filter.

In the accompanying drawings, I have illustrated a present preferred embodiment of my invention in which—

Figure 1:
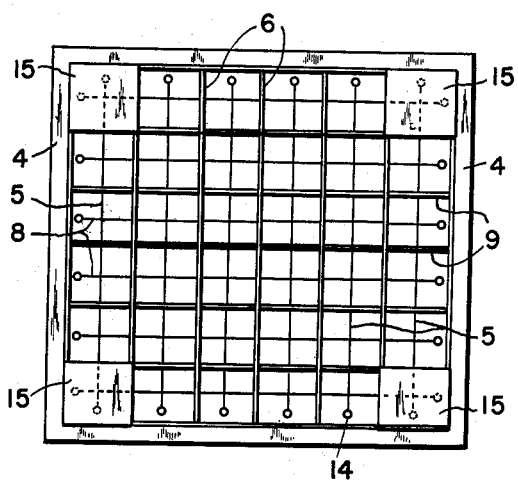
Figure 1 is a front elevation of an ionizing unit embodying my invention.

My ionizing unit has a generally rectangular casing 4 which may be fabricated from sheet metal and which is opened at both ends. In the front of the casing (in the direction of fluid flow through the unit), I mount a set of ionizing wires 5 which extend substantially the full distance between two sides of the casing 4 and which are spaced away from, but parallel to, each other across the space between the other two sides of the casing. The ionizing wires are mounted so that they are electrically insulated from the balance of the ionizing unit. The structure for mounting the wires in this manner will be later described.

Spaced between and parallel to the ionizing wires are a plurality of electrodes 6. These electrodes have a much larger surface than the surface of the ionizing wires and, preferably, are in the form of flat rectangular plates. These electrodes also extend substantially the full distance between two sides of the casing 4, but are electrically grounded or connected to the casing 4. Preferably, the electrodes 6 are mounted parallel to each other in a rectangular frame 7 (see Figure 3). This frame and all of the electrodes 6 can be slid as a unit into the front of the casing 4.

Immediately to the rear of the electrodes 6, I provide a second set of ionizing wires 8 which extend substantially from one side to the other of the casing 4 and which are spaced between the two other sides of the casing and parallel to each other. It should be noted that the ionizing wires 8 extend in a direction which is at an angle to the direction in which the ionizing wires 5 extend. Preferably, as shown in the drawings, the wires 5 lie in a plane parallel to the plane in which the wires 8 lie, but the wires 5 and 8 extend in directions at right angles to each other.

I also provide a second set of electrodes 9 which are the same in construction as the electrodes 6 and which may be held together as a unit in a rectangular frame 10. The electrodes 9 and the frame 10 can be slid into the rear of the casing 4 so that the electrodes will lie between and parallel to the ionizing wires 8. Since the electrodes 9 are parallel to the ionizing wires 8, they extend in a direction which is at an angle to the direction in which the electrodes 6 extend.

Figure 2:
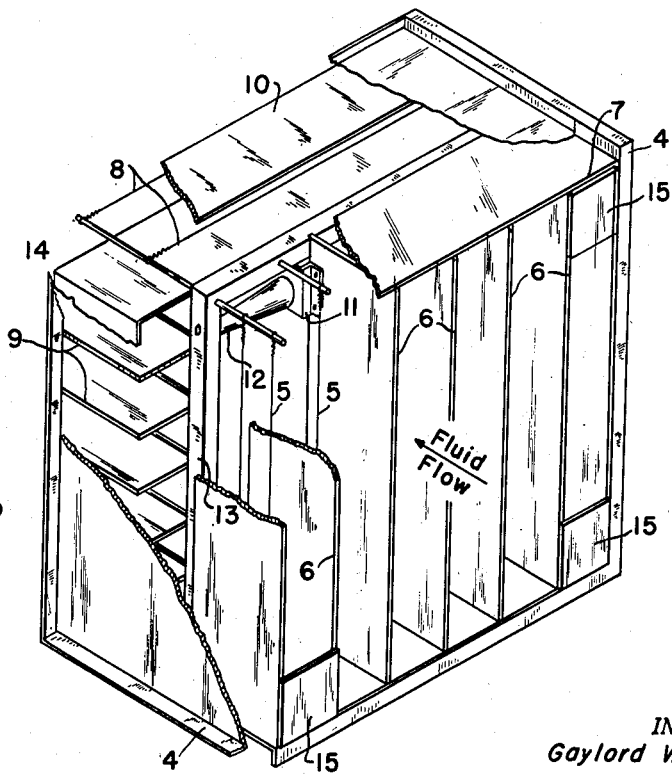
Figure 2 is an isometric view of my unit with certain portions removed for purposes of illustration.
Figure 3:
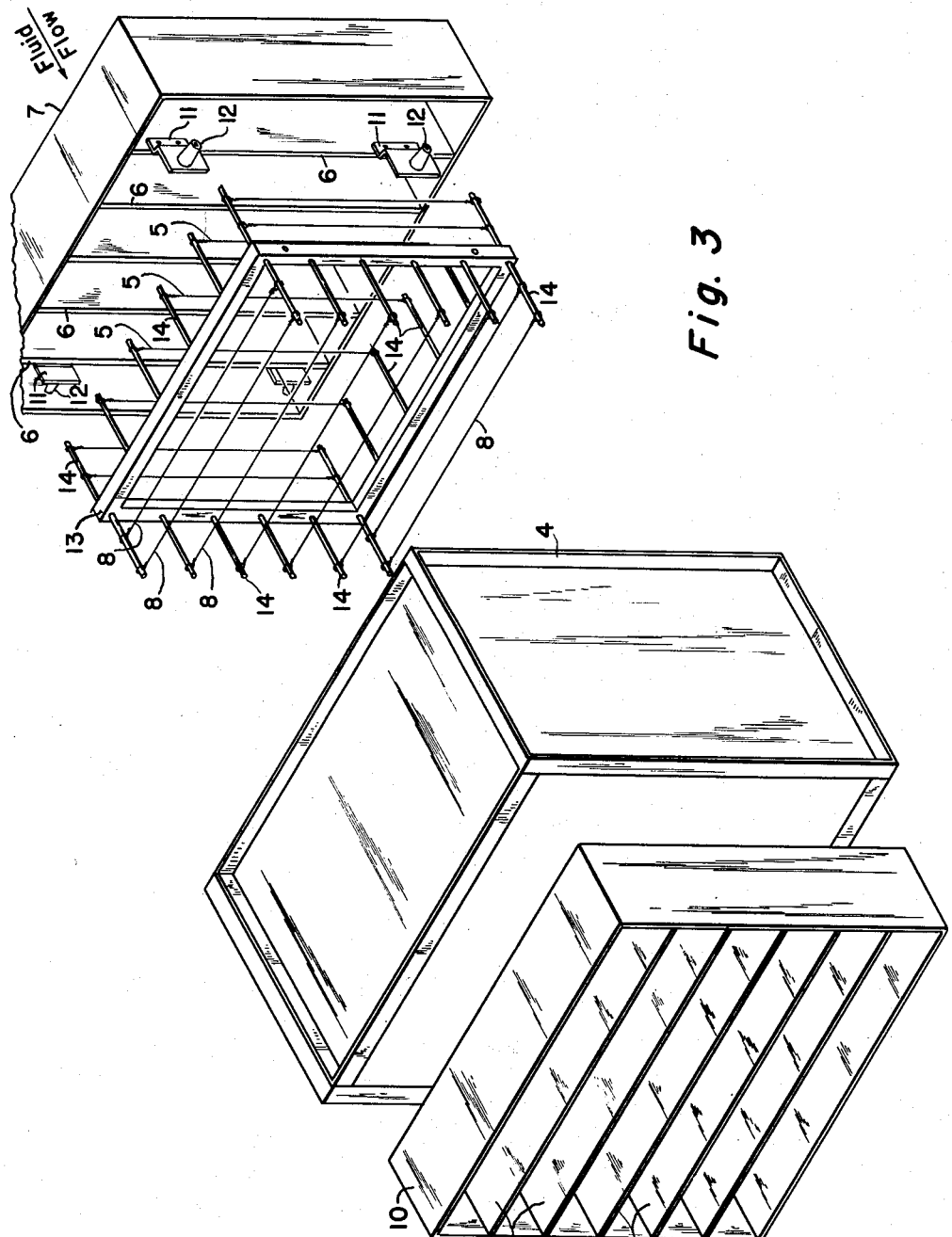
Figure 3 is an exploded view showing the several components of my unit.

Figures 2 and 3 show the structure for supporting the ionizing wires 5 and 8. Brackets 11 fastened to the rear edge of some of the electrodes 6 (preferably the first electrodes which are spaced inwardly from the sides of the frame 7) extend rearwardly of the electrodes and carry conventional insulators 12. The insulators 12 in turn support a frame 13 which is in the form of a hollow rectangle. Pins 14 extend forwardly and rearwardly from the frame 13 and the ionizing wires 5 and 8 are secured to these pins, as shown in Figures 2 and 3.

Looking at Figure 1, it will be seen that the fluid to be cleaned will flow first past the vertical ionizing wires and then the horizontal ionizing wires. Since the fluid passes through one ionizing zone having an appreciable depth, the particles carried by the fluid are adequately ionized and are picked up on the plates of the collecting cell.

Looking at Figure 1, it will be seen that the top and bottom horizontal wires are in line with the ends of the vertical wires and that the outside vertical wires are in line with the ends of the horizontal wires. Since the wires are "dead" adjacent their ends, fluid passing adjacent the ends of the wires will, in effect, flow past only one active ionizing wire. I overcome this difficulty by providing two ionizing wires on the pins which extend forwardly and rearwardly from the corners of the frame 13. The result is that fluid, although it flows adjacent to the end of an ionizing wire, nevertheless flows past two ionizing wires and the particles in the fluid are thereby adequately ionized.

At certain points the ends of both the ionizing wires 5 and the ionizing wires 8 will be in line in the direction of flow of fluid through the unit.

In the case of a unit arranged as shown in the drawings, the wires will be in line at the four corners of the unit (see Figure 1). Air or gas passing adjacent these points will not be subjected to an ionizing electrostatic field, and, therefore, I place baffles 15 in each of the four corners of my unit which prevent the flow of gas or air in those areas. Preferably, these baffles 15 constitute small square plates which are welded to the rectangular frame 7 and to those of the electrodes 6 which are next to the sides of the frame 7. As appears in Figure 1, these baffles are as wide as the spacing between the electrodes 6 and as high as the spacing between the electrodes 9.

These baffles 15 not only prevent air or gas from flowing past the ends of the ionizing wires where the ends of the two sets coincide, but they also prevent air or gas from flowing over the insulators 12 which are placed in line with and to the rear of the baffles. In this position, the insulators will not accumulate dirt from the air or gas to be cleaned, which dirt would in time cause sparkover.

Figure 4:
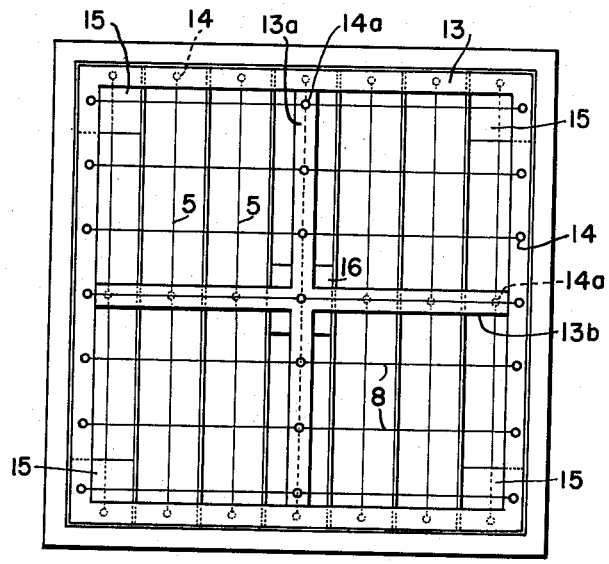
Figure 4 is a front elevation of a modified form of my ionizing unit.
Figure 5:
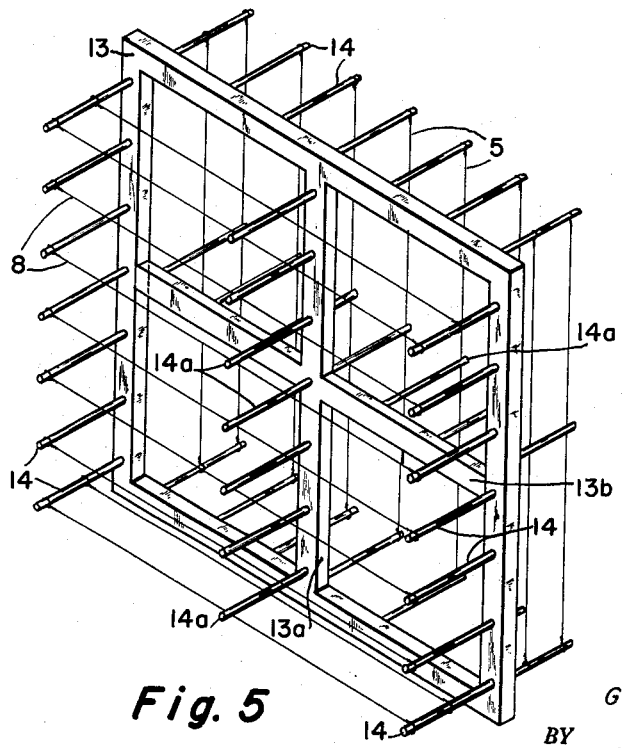
Figure 5 is an isometric view of the ionizing wires and the support therefor which are used in the ionizing unit shown in Figure 4.

In Figures 4 and 5 of the drawings, I have shown a modification of my ionizing unit. This modification provides for supports to the ionizing wires in portions between their ends in the event that the ionizing wires are so long that intermediate support is required.

The ionizing unit shown in Figures 4 and 5 is generally the same as that shown in Figures 1 to 3, except that the hollow rectangular frame 13 which supports the ionizing wires has a vertical cross member 13a which extends from top to bottom of the frame and a horizontal cross member 13b which extends from side to side. These cross members extend across the frame 13 and lie parallel to the ionizing wires 5 and 8. The cross members carry pins 14a which extend forwardly and rearwardly from the cross members in the same manner as the pins 14. The pins 14a support the ionizing wires at intermediate portions along the length of the wires. One way in which the wires can be secured to the pins 14a is to pass the wires through small holes drilled in the ends of the pins.

From Figures 4 and 5, it will be seen that the cross members 13a and 13b are centrally positioned within the frame 13. This arrangement is used when the length of the wire is such that only one intermediate support is required. The vertical cross member 13a supports the horizontally extending ionizing wires 8 at their midpoints and the horizontal cross member 13b supports the vertically extending ionizing wires 5 at their midpoints. If the length of the ionizing wires is such that more than one intermediate support is required, additional cross members can be added to the frame 13.

Referring to Figure 4, it will be seen that the modified form of my ionizing unit has baffles 15 in the four corners in the same manner as the baffles 15 in the ionizing unit shown in Figures 1 to 3. The modified form of ionizing unit also has a baffle 16 which is carried by two ground electrodes in front of the ionizing wires and at the point where the cross members 13a and 13b intersect. As is apparent from Figure 5, fluid which passes adjacent the intersection of the cross members will also flow adjacent portions of both the vertical and horizontal wires which are near supports and which, therefore, are "dead." The baffle 16 prevents air from passing through this dead area.

From the foregoing, it is apparent that my ionizing unit provides an ionizing section having a definite length sufficient to ionize particles in fluid which is passing through the unit at high velocities. The ionizing unit, however, is very compact so that the effect of a plurality of ionizing units in series is accomplished without materially increasing the length of the ionizing unit. I am also able to avoid the effect of dead areas adjacent supports for the ionizing wires without adding a number of baffles which would detract from the chief purpose of a high velocity filter, namely, the cleaning of a large volume of air without a corresponding increase in the overall size of the filter.

While I have described certain present preferred embodiments of my invention, it is to be understood that it may be otherwise embodied within the scope of the appended claims.

I claim:

1. An ionizing unit for electrostatic filters comprising two sets of electrodes, each set having opposed pairs of electrodes spaced across the path of fluid flow through the unit, one set being positioned behind the other in the direction of fluid flow, one set of electrodes extending in a direction which is at an angle to the direction in which the other set extends whereby the majority of the ends of the electrodes of each set lie in line in the direction of fluid flow with portions of the electrodes in the other set which are spaced from the ends of the electrodes of which they form a part.

2. An ionizing unit for electrostatic filters comprising two sets of electrodes, each set having opposed pairs of electrodes spaced across the path of fluid flow through the unit, one set being positioned behind the other in the direction of fluid flow, one set of electrodes extending in a direction which is at an angle to the direction in which the other set extends whereby the majority of the ends of the electrodes of each set lie in line in the direction of fluid flow with portions of the electrodes in the other set which are spaced from the ends of the electrodes of which they form a part, and baffles in advance in the direction of fluid flow of both sets of electrodes in those areas where the ends of the electrodes in both sets are in line with each other.

3. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other whereby the majority of the ends of the wires of each set are in line in the direction of fluid flow with portions of the wires in the other set which are spaced from the ends of the wires of which they are a part.

4. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other whereby the majority of the ends of the wires of each set are in line in the direction of fluid flow with portions of the wires in the other set spaced from the ends of the wires of which they are a part, and baffles in advance in the direction of fluid flow of both sets of wires in those areas where the ends of the wires in both sets are in line with each other.

5. An ionizing unit as described in claim 4 in which each set of ionizing wires has two wires placed in tandem behind the baffles.

6. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of of wires and extending parallel thereto, the two sets of wires extending in directions which are at an angle to each other, a frame for supporting both sets of ionizing wires, and insulators secured to some of the electrodes and supporting said frame.

7. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other, baffles in advance in the direction of fluid flow of both sets of wires in those areas where the ends of the wires in both sets are in line with each other, a frame for supporting both sets of ionizing wires, and insulators to support said frame, said insulators being positioned to the rear of said baffles.

8. An ionizing unit for electrostatic filters comprising a generally rectangular shaped casing of sheet metal and open at two ends, ionizing wires spaced parallel to each other across the front end of the casing and substantially the full distance between sides of the casing, electrodes spaced between and parallel to the wires, a second set of wires positioned back of the first set and also being spaced across substantially the full distance between the sides of the casing, electrodes spaced between and parallel to the second set of wires, the two sets of wires extending in directions at an angle to each other whereby the ends of the majority of the wires of each set are in line in the direction of fluid flow through the casing with portions of the wires of the other set which are spaced from the ends of the wires of which they are a part.

9. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other, a frame positioned between the two sets of ionizing wires for supporting both sets of wires, and insulators secured to some of the electrodes and supporting said frame.

10. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other, a frame in the form of a hollow rectangle positioned between the two sets of ionizing wires, and pins extending forwardly and rearwardly from the frame between the electrodes, the ionizing wires being secured at their ends to the outer ends of the pins.

11. An ionizing unit for electrostatic filters comprising a set of ionizing wires spaced parallel to each other and across the path of fluid flow through the unit, electrodes positioned between the wires and extending parallel thereto, a second set of ionizing wires positioned to the rear of the first set of wires in the direction of fluid flow through the unit and electrodes between the second set of wires and extending parallel thereto, the two sets of wires extending in directions which are at an angle to each other, a frame in the form of a hollow rectangle with cross members positioned between the two sets of ionizing wires, pins extending forwardly and rearwardly from the frame and from the cross members between the electrodes, the ionizing wires being secured at their ends to the pins extending from the frames and between their ends to the pins extending from the cross members.

12. An ionizing unit as described in claim 10 and having baffles in front of the ionizing wires where the ends of one set of wires are in line in the direction of fluid flow with the ends of the other set of wires.

13. An ionizing unit as described in claim 11 and having baffles in front of the ionizing wires where the ends of one set of wires are in line in the direction of fluid flow with the ends of the other set of wires and baffles in front of the ionizing wires where said cross members intersect.

GAYLORD W. PENNEY.

References Cited in the file of this patent

UNITED STATES PATENTS

| Number | Name | Date |
|---|---|---|
| 2,579,445 | Warburton | Dec. 15, 1951 |
| 2,634,818 | Wintermute | Apr. 14, 1953 |